(12) United States Patent
Nakahara et al.

(10) Patent No.: US 10,164,250 B2
(45) Date of Patent: Dec. 25, 2018

(54) LITHIUM-IRON-MANGANESE-BASED COMPOSITE OXIDE AND LITHIUM-ION SECONDARY BATTERY USING SAME

(71) Applicants: NEC Corporation, Tokyo (JP); Tanaka Chemical Corporation, Fukui (JP)

(72) Inventors: Kentaro Nakahara, Tokyo (JP); Ryota Yuge, Tokyo (JP); Noriyuki Tamura, Tokyo (JP); Sadanori Hattori, Tokyo (JP); Kentaro Kuratani, Osaka (JP); Kyousuke Doumae, Fukui (JP); Hideka Shibuya, Fukui (JP); Mitsuharu Tabuchi, Osaka (JP)

(73) Assignees: NEC Corporation, Tokyo (JP); Tanaka Chemical Corporation, Fukui (JP)

( * ) Notice: Subject to any disclaimer, the term of this patent is extended or adjusted under 35 U.S.C. 154(b) by 261 days.

(21) Appl. No.: 14/913,892

(22) PCT Filed: Aug. 19, 2014

(86) PCT No.: PCT/JP2014/071657
§ 371 (c)(1),
(2) Date: Feb. 23, 2016

(87) PCT Pub. No.: WO2015/025844
PCT Pub. Date: Feb. 26, 2015

(65) Prior Publication Data
US 2016/0218360 A1 Jul. 28, 2016

(30) Foreign Application Priority Data
Aug. 23, 2013 (JP) .................................. 2013-173271

(51) Int. Cl.
| | | |
|---|---|---|
| *H01M 4/36* | (2006.01) | |
| *H01M 4/485* | (2010.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC .......... *H01M 4/366* (2013.01); *H01M 4/485* (2013.01); *H01M 4/505* (2013.01); *H01M 4/525* (2013.01); *H01M 10/0525* (2013.01); *H01M 2004/028* (2013.01); *Y02T 10/7011* (2013.01)

(58) Field of Classification Search
CPC ...... H01M 4/366; H01M 4/525; H01M 4/505; H01M 4/485; H01M 10/0525; H01M 2004/028
See application file for complete search history.

(56) References Cited

U.S. PATENT DOCUMENTS

| | | | |
|---|---|---|---|
| 2009/0087362 A1 | 4/2009 | Sun et al. | |
| 2011/0076556 A1* | 3/2011 | Karthikeyan | ......... H01M 4/366 |
| | | | 429/188 |
| 2011/0111298 A1 | 5/2011 | Lopez et al. | |

FOREIGN PATENT DOCUMENTS

| | | |
|---|---|---|
| JP | 2000-348730 A | 12/2000 |
| JP | 2003-500318 A | 1/2003 |
| JP | 2005-154256 A | 6/2005 |
| JP | 2006-156032 A | 6/2006 |
| JP | 2007-005267 A | 1/2007 |
| JP | 2008-536285 A | 9/2008 |
| JP | 2011-187190 A | 9/2011 |
| JP | 2013-503449 A | 1/2013 |
| JP | 2013-503450 A | 1/2013 |
| JP | 2013-037824 A | 2/2013 |
| JP | 2013-511129 A | 3/2013 |

OTHER PUBLICATIONS

International Search Report corresponding to PCT/JP2014/071657 dated Oct. 28, 2014 (2 pages).
Japanese Office Action issued by the Japan Patent Office for Japanese Application No. 2015-532861 dated Jul. 31, 2018 (5 pages).

\* cited by examiner

*Primary Examiner* — Laura Weiner
(74) *Attorney, Agent, or Firm* — Wilmer Cutler Pickering Hale and Dorr LLP (57) ABSTRACT

There is provided a lithium-iron-manganese-based composite oxide capable of providing a lithium-ion secondary battery which has a high capacity retention rate in charge/discharge cycles and in which the generation of a gas caused by charge/discharge cycles is reduced. A lithium-iron-manganese-based composite oxide having a layered rock-salt structure, wherein at least a part of the surface of a lithium-iron-manganese-based composite oxide represented by the following formula (1) is coated with an inorganic material: $Li_xM^1_{(y-p)}Mn_pM^2_{(z-p)}Fe_qO_{(2-\delta)}$ (1) (wherein $1.05 \leq x \leq 1.32$, $0.33 \leq y \leq 0.63$, $0.06 \leq z \leq 0.50$, $0 < p \leq 0.63$, $0.06 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn).

7 Claims, 4 Drawing Sheets

LITHIUM-IRON-MANGANESE-BASED COMPOSITE OXIDE AND LITHIUM-ION SECONDARY BATTERY USING SAME

CROSS-REFERENCE TO RELATED APPLICATIONS

This application is a national stage application of International Application No. PCT/JP2014/071657 entitled "Lithium-Iron-Manganese-Based Composite Oxide and Lithium-Ion Secondary Battery Using Same" filed on Aug. 19, 2014, which claims priority to Japanese Application No. 2013-173271 filed on Aug. 23, 2013, the disclosures of which are hereby incorporated by reference in their entirety.

TECHNICAL FIELD

Exemplary embodiments relate to a lithium-iron-manganese-based composite oxide and a lithium-ion secondary battery using the same.

BACKGROUND ART

A lithium-ion secondary battery including a positive electrode containing a lithium-iron-manganese-based composite oxide as a positive electrode active material and a negative electrode containing a material capable of intercalating/deintercalating lithium ions as a negative electrode active material is expected to be a secondary battery having a high energy density. For example, Patent Literature 1 discloses a lithium-ion secondary battery using a lithium-iron-manganese-based composite oxide for a positive electrode active material. On the other hand, Patent Literatures 2 to each disclose a technique relating to a coating on a surface.

CITATION LIST

Patent Literature

Patent Literature 1: JP2005-154256A
Patent Literature 2: JP2011-187190A
Patent Literature 3: U.S. Patent Application No. 2011/0111298
Patent Literature 4: U.S. Patent Application No. 2011/0076556
Patent Literature 5: JP2003-500318A
Patent Literature 6: JP2013-511129A

SUMMARY OF INVENTION

Technical Problem

However, the lithium-ion secondary batteries disclosed in the Patent Literatures have the problem of the reduction of the capacity of the secondary battery as charge/discharge cycles are repeated.

It is an object of an exemplary embodiment to provide a lithium-iron-manganese-based composite oxide capable of providing a lithium-ion secondary battery which has a high capacity retention rate in charge/discharge cycles and in which the generation of a gas caused by charge/discharge cycles is reduced.

Solution to Problem

A lithium-iron-manganese-based composite oxide according to an exemplary embodiment has a layered rock-salt structure, and at least a part of the surface of a lithium-iron-manganese-based composite oxide represented by the following formula (1) is coated with an inorganic material:

$$Li_xM^1_{(y-p)}Mn_pM^2_{(z-p)}Fe_qO_{(2-\delta)} \qquad (1)$$

wherein 1.05≤x≤1.32, 0.33≤y≤0.63, 0.06≤z≤0.50, 0<p≤0.63, 0.06≤q≤0.50, 0≤δ≤0.80, y≥p, and z≥q; $M^1$ is at least one element selected from Ti and Zr; and $M^2$ is at least one element selected from the group consisting of Co, Ni and Mn.

A positive electrode active material for a lithium-ion secondary battery according to an exemplary embodiment contains the lithium-iron-manganese-based composite oxide.

A positive electrode for a lithium-ion secondary battery according to an exemplary embodiment contains the positive electrode active material for a lithium-ion secondary battery.

A lithium-ion secondary battery according to an exemplary embodiment includes the positive electrode for a lithium-ion secondary battery and a negative electrode.

Advantageous Effects of Invention

An exemplary embodiment can provide a lithium-iron-manganese-based composite oxide capable of providing a lithium-ion secondary battery which has a high capacity retention rate in charge/discharge cycles and in which the generation of a gas caused by charge/discharge cycles is reduced.

BRIEF DESCRIPTION OF DRAWINGS

FIG. 3 shows (a) SEM images in combination with EDX mappings and (b) an SEM image in combination with an EDX point analysis for a lithium-iron-manganese-based composite oxide coated with germanium oxide in Example 2.

DESCRIPTION OF EMBODIMENTS

[Lithium-Iron-Manganese-Based Composite Oxide]

A lithium-iron-manganese-based composite oxide according to an exemplary embodiment has a layered rock-salt structure, and at least a part of the surface of a lithium-iron-manganese-based composite oxide represented by the following formula (1) is coated with an inorganic material:

$$Li_xM^1_{(y-p)}Mn_pM^2_{(z-p)}Fe_qO_{(2-\delta)} \qquad (1)$$

wherein 1.05≤x≤1.32, 0.33≤y≤0.63, 0.06≤z≤0.50, 0<p≤0.63, 0.06≤q≤0.50, 0≤δ≤0.80, y≥p, and z≥q; $M^1$ is at least one element selected from Ti and Zr; and $M^2$ is at least one element selected from the group consisting of Co, Ni and Mn.

A lithium-iron-manganese-based composite oxide having a layered rock-salt structure in which $Li_2Me^1O_3$ ($Me^1$ at least includes Mn) and $LiMe^2O_2$ ($Me^2$ at least includes Fe) are dissolved together in a solid solution is advantageous because when it is used as a positive electrode active material for a lithium-ion secondary battery (hereinafter, also referred to as positive electrode active material), a lithium-ion secondary battery (hereinafter, also referred to as secondary battery) can be provided which has a higher energy density than those of a lithium-nickel-manganese-based composite oxide and a lithium-cobalt-manganese-based composite oxide, in which the $Me^2$ at least includes Ni and Co, respectively, in place of Fe. However, the lithium-iron-manganese-based composite oxide is prone to detach oxygen in charge/discharge cycles after activation.

When oxygen is detached in charge/discharge cycles, the structure of the positive electrode active material changes from a layered rock-salt structure to a spinel structure, and as a result the capacity of the secondary battery is lowered. Further, $Li_2O$ is generated on the negative electrode due to the detached oxygen, which also lowers the capacity of the secondary battery. Furthermore, the secondary battery swells due to the detachment of oxygen to increase the resistance, and hence the capacity of the secondary battery is lowered.

The lithium-iron-manganese-based composite oxide (hereinafter, also referred to as composite oxide) according to an exemplary embodiment is a composite oxide having the specific composition represented by the formula (1) and at least a part of the surface thereof is coated with an inorganic material. Since at least a part of the surface of the lithium-iron-manganese-based composite oxide is coated with an inorganic material, the detachment of oxygen from the inside of the lithium-iron-manganese-based composite oxide can be physically reduced in charge/discharge cycles. In addition, coating the surface of the lithium-iron-manganese-based composite oxide with an inorganic material enables the reduction of the generation of a gas caused by the reaction with the electrolytic solution. Therefore, in the case that the composite oxide according to an exemplary embodiment is used, the capacity of the secondary battery is retained even in charge/discharge cycles, which not only provides a high capacity retention rate but also reduces the generation of a gas in charge/discharge cycles. Hereinafter, details of exemplary embodiments will be described.

The composite oxide represented by the formula (1) at least contains Mn. The composition p for Mn satisfies $0<p\leq0.63$. $0<p$ allows the composite oxide to contain an excessive amount of lithium. Further, $p\leq0.63$ allows the composite oxide to be in a state in which $Li_2Me^1O_3$ ($Me^1$ at least includes Mn) and $LiMe^2O_2$ ($Me^2$ at least includes Fe) are dissolved together in a solid solution. p preferably satisfies $0.10\leq p\leq0.60$, more preferably satisfies $0.20\leq p\leq0.55$, and still more preferably satisfies $0.30\leq p\leq0.50$.

In the formula (1), $M^1$ is at least one element of Ti and Zr. y in the composition y–p for $M^1$ satisfies $0.33\leq y\leq0.63$. $0.33\leq y$ allows the composite oxide to contain an excessive amount of lithium. Further, $y\leq0.63$ allows the composite oxide to be in a state in which $Li_2Me^1O_3$ ($Me^1$ at least includes Mn) and $LiMe^2O_2$ ($Me^2$ at least includes Fe) are dissolved together in a solid solution. y preferably satisfies $0.35\leq y\leq0.60$, more preferably satisfies $0.40\leq y\leq0.55$, and still more preferably satisfies $0.45\leq y\leq0.50$. It is to be noted that the formula (1) satisfies $y\geq p$. Optionally, the composition y–p for $M^1$ may be 0. That is, the composite oxide represented by the formula (1) may contain no $M^1$. Mn and $M^1$ in the formula (1) correspond to $Me^1$ in the $Li_2Me^1O_3$.

The composite oxide represented by the formula (1) at least contains Fe. The composition q for Fe satisfies $0.06\leq q\leq0.50$. $0.06\leq q$ allows the lithium-iron-manganese-based composite oxide to be activated. Further, $q\leq0.50$ allows the composite oxide to maintain the capacity high. q preferably satisfies $0.10\leq q\leq0.45$, more preferably satisfies $0.13\leq q\leq0.40$, and still more preferably satisfies $0.16\leq q\leq0.30$.

In the formula (1), $M^2$ is at least one element selected from the group consisting of Co, Ni and Mn. z in the composition z–q for $M^2$ satisfies $0.06\leq z\leq0.50$. $0.06\leq z$ allows the lithium-iron-manganese-based composite oxide to be activated. Further, $z\leq0.50$ allows the composite oxide to contain an excessive amount of lithium. z preferably satisfies $0.08\leq z\leq0.45$, more preferably satisfies $0.10\leq z\leq0.40$, and still more preferably satisfies $0.12\leq z\leq0.30$. It is to be noted that the formula (1) satisfies $z\geq q$. Optionally, the composition z–q for $M^2$ may be 0. That is, the composite oxide represented by the formula (1) may contain no $M^2$. Fe and $M^2$ in the formula (1) correspond to $Me^2$ in the $LiMe^2O_2$.

In the formula (1), the composition x for Li satisfies $1.05\leq x\leq1.32$. $1.05\leq x$ allows the composite oxide to have a high capacity. Further, $x\leq1.32$ allows the composite oxide to be in a state in which $Li_2Me^1O_3$ ($Me^1$ at least includes Mn) and $LiMe^2O_2$ ($Me^2$ at least includes Fe) are dissolved together in a solid solution. x preferably satisfies $1.08\leq x\leq1.30$, more preferably satisfies $1.12\leq x\leq1.28$, and still more preferably satisfies $1.16\leq x\leq1.26$.

In the formula (1), $\delta$ in the composition 2–$\delta$ for oxygen atoms, which is a parameter indicating oxygen defect, satisfies $0\leq\delta\leq0.80$. $0\leq\delta$ allows the composite oxide to have a high capacity. Further, $\delta\leq0.80$ allows the composite oxide to stabilize the crystalline structure. $\delta$ preferably satisfies $0.02\leq\delta\leq0.50$, more preferably satisfies $0.04\leq\delta\leq0.30$, and still more preferably satisfies $0.06\leq\delta\leq0.20$. It is to be noted that $\delta$ varies depending not only on the formulation ratio of $Me^1$ to $Me^2$ but also on the method for synthesizing the composite oxide.

Regarding the compositions for the respective elements in the formula (1), the composition for Li is a value measured by using inductively-coupled plasma-atomic emission spectroscopy, and each of the compositions for the other elements is a value measured by using inductively-coupled plasma-mass spectrometry. Here, each of the compositions for the respective elements in the formula (1) does not include an inorganic material used for the surface coating.

The composite oxide represented by the formula (1) has a layered rock-salt structure. The layered rock-salt structure of the composite oxide enables charge/discharges to be repeated stably. The presence/absence of a layered rock-salt structure can be determined by using X-ray diffraction analysis. It is not necessary that the whole of the composite oxide has a layered rock-salt structure, and at least a part of the composite oxide may have a layered rock-salt structure.

In the lithium-iron-manganese-based composite oxide according to an exemplary embodiment, at least a part of the surface is coated with an inorganic material. That is, the lithium-iron-manganese-based composite oxide according to an exemplary embodiment has an inorganic material other than the lithium-iron-manganese-based composite oxide on the surface. Since at least a part of the surface of the lithium-iron-manganese-based composite oxide is physically coated with an inorganic material, oxygen can be retained within the lithium-iron-manganese-based composite oxide even in charge/discharge cycles to reduce the detachment of oxygen to the outside. Further, coating with an inorganic material enables the reduction of the generation of a gas caused by the reaction with the electrolytic solution. The presence/absence of a coating with an inorganic material in at least a part of the surface of the lithium-iron-manganese-based composite oxide can be determined by using scanning electron microscopy (energy dispersive X-ray spectrometry), transmission electron microscopy, or X-ray photoelectron spectroscopy.

The inorganic material to be used can be germanium oxide, tin oxide, silicon oxide, molybdenum oxide, cerium oxide, gadolinium oxide, erbium oxide, aluminum oxide, aluminum fluoride, titanium oxide, zirconium oxide or the like. Among them, aluminum oxide, aluminum fluoride and titanium oxide are preferred as the inorganic material from the viewpoint of a stable use. Particularly, germanium oxide, cerium oxide, gadolinium oxide and erbium oxide are effective for reducing the generation of a gas, and the effect can be enhanced by combining more than one of them. One of these inorganic materials may be used singly, or two or more thereof may be used in combination.

The content of the inorganic material based on the lithium-iron-manganese-based composite oxide containing the inorganic material is preferably 0.1% by mass or more and 15% by mass or less. Due to the content being 0.1% by mass or more, the detachment of oxygen to the outside can be sufficiently reduced in charge/discharge cycles. Further, due to the content being 15% by mass or less, the intercalation/deintercalation of Li is not inhibited. The content is more preferably 0.2% by mass or more and 10% by mass or less, still more preferably 0.3% by mass or more and 2% by mass or less, and particularly preferably 0.5% by mass or more and 1% by mass or less.

The shape of the inorganic material is not particularly limited as long as the inorganic material is coating at least a part of the surface of the lithium-iron-manganese-based composite oxide, and may be layered or particulate.

[Method for Producing Lithium-Iron-Manganese-Based Composite Oxide]

The method for producing the lithium-iron-manganese-based composite oxide according to an exemplary embodiment is not particularly limited as long as at least a part of the surface of the lithium-iron-manganese-based composite oxide having a layered rock-salt structure and satisfying the formula (1) is coated with an inorganic material. For example, a lithium-iron-manganese-based composite oxide having a layered rock-salt structure and satisfying the formula (1) and a hydrolyzable compound as a raw material for the inorganic material are mixed in a solution to react together, and thereafter heat-treated, and as a result at least a part of the surface of the lithium-iron-manganese-based composite oxide can be coated with the inorganic material. Specifically, examples of the method include the following methods.

The method for producing the lithium-iron-manganese-based composite oxide before being coated with an inorganic material is not particularly limited, and it can be produced by performing heat treatment such as calcination and hydrothermal treatment for a metal raw material at least containing lithium, manganese, iron and the like. On the other hand, in order to obtain a lithium-iron-manganese-based composite oxide more excellent in electrochemical properties, it is preferred to mix constituent metal elements other than lithium more homogeneously. From this viewpoint, for example, a method is preferred in which a composite hydroxide of iron, manganese and the like is obtained from a liquid phase and calcined together with a lithium compound. This method can be roughly divided into a step of production of a composite hydroxide to produce a composite hydroxide containing constituent metals other than lithium and a step of calcination to calcine the composite hydroxide under the coexistence of lithium.

<Step of Production of Composite Hydroxide>

The composite hydroxide can be made by adding water-soluble salts of its constituent metals to an alkaline aqueous solution dropwise to precipitate, performing air oxidation as necessary, and aging the hydroxide. The water-soluble salt of a constituent metal is not particularly limited, and examples thereof include an anhydrite and a hydrate of a nitrate, a sulfate, a chloride, an acetate or the like of a constituent metal. Likewise, the alkali source is not particularly limited, and examples thereof include lithium hydroxide and a hydrate thereof, sodium hydroxide, potassium hydroxide and an aqueous ammonia. One of these may be used singly, or two or more thereof may be used in combination. The composite hydroxide can be obtained by gradually adding water-soluble salts of its constituent metals to an alkaline aqueous solution dropwise over several hours. The temperature when adding water-soluble salts of the constituent metals is preferably 60° C. or lower from the viewpoint of reducing the formation of an impurity such as spinel ferrite. In the case that water-soluble salts of the constituent metals are added dropwise at a temperature of 0° C. or lower, it is preferred to add ethanol or the like as an antifreeze to the alkaline aqueous solution to prevent the solidification of the solution. Preferably, the hydroxide obtained after the dropwise addition is aged by blowing an air therein at a room temperature for several hours or longer to wet-oxidize the hydroxide. The composite hydroxide desired can be obtained by washing the aged product with water and filtering the resultant.

<Step of Calcination>

To the composite hydroxide is added a predetermined lithium compound according to a compositional formula, and mixed together, and the resultant is then subjected to calcination in a predetermined atmosphere. Thereafter, washing with water, filtration and drying are performed as necessary for removing an excess of the lithium compound to provide a lithium-iron-manganese-based composite oxide having a desired compositional formula. The lithium compound is not particularly limited, and can be used an anhydride or a hydrate of lithium carbonate, lithium hydroxide, lithium nitrate, lithium acetate or the like. One of these may be used singly, or two or more thereof may be used in combination. The calcination temperature is preferably 1000° C. or lower from the viewpoint of preventing the volatilization of Li. The calcination atmosphere to be used can be an air atmosphere, an inert gas atmosphere, a nitrogen atmosphere, an oxygen atmosphere or the like. Through these steps, a lithium-iron-manganese-based composite oxide having a desired composition before being coated with an inorganic material can be made.

The source for an inorganic material for coating is preferably a chloride, a hydroxide, a carbonate, a nitrate, an acetate, an alcoholate or the like containing germanium, tin, silicon, molybdenum, cerium, gadolinium, erbium, aluminum, titanium, zirconium or the like. One of these may be used singly, or two or more thereof may be used in combination. Although the concentration of them in each of aqueous solutions or alcohol solutions is not particularly limited, the concentration is preferably 0.002 to 0.05% by mass. Due to the concentration being 0.002% by mass or more, the amount of time required for the evaporation of water or alcohol is reduced, which improves the production efficiency. Further, due to the concentration being 0.05% by mass or less, the raw material is sufficiently dissolved to provide a homogeneous mixed solution.

After the evaporation of water or alcohol followed by drying, the resultant dry product can be calcined in an oxygen-containing gas at 400 to 800° C. Due to the calcination temperature being 400° C. or higher, the reaction is completed and propoxide or the like does not remain. Further, due to the calcination temperature being 800° C. or lower, the reaction with the lithium in the lithium-iron-manganese-based composite oxide is reduced, and as a result the contamination of a lithium compound as an impurity can be prevented. The method for drying is not particularly limited, and examples thereof include, in addition to a conventional method for drying, a method for drying using a rotary evaporator, a spray dryer or the like. As the oxygen-containing gas, an air is preferred.

[Positive Electrode Active Material for Lithium-Ion Secondary Battery]

A positive electrode active material for a lithium-ion secondary battery according to an exemplary embodiment contains the lithium-iron-manganese-based composite oxide according to an exemplary embodiment. Due to that the positive electrode active material contains the lithium-iron-manganese-based composite oxide according to an exemplary embodiment, the detachment of oxygen is reduced even in charge/discharge cycles and the capacity of the secondary battery is retained.

The content of the lithium-iron-manganese-based composite oxide according to an exemplary embodiment in the positive electrode active material for a lithium-ion secondary battery according to an exemplary embodiment is preferably 80% by mass or more, more preferably 90% by mass or more, and still more preferably 95% by mass or more. It is to be noted that the content may be 100% by mass, that is, the positive electrode active material for a lithium-ion secondary battery according to an exemplary embodiment may consist of the lithium-iron-manganese-based composite oxide according to an exemplary embodiment.

[Positive Electrode for Lithium-Ion Secondary Battery]

A positive electrode for a lithium-ion secondary battery according to an exemplary embodiment (hereinafter, also referred to as positive electrode) contains the positive electrode active material for a lithium-ion secondary battery according to an exemplary embodiment.

The positive electrode can be made by applying the positive electrode active material according to an exemplary embodiment onto a positive electrode current collector. For example, the positive electrode can be made by mixing the positive electrode active material according to an exemplary embodiment, a conductivity-imparting agent, a binder and a solvent together, coating a positive electrode current collector with the mixture, and drying the resultant. The conductivity-imparting agent to be used can be a carbon material such as Ketjen black, a metal material such as Al, a conductive oxide or the like. The binder to be used can be a polyvinylidene fluoride, an acrylic resin, a polytetrafluoroethylene resin or the like. The solvent to be used can be N-methylpyrrolidone or the like. The positive electrode current collector to be used can be a metal thin film primarily containing aluminum or the like. Although the thickness of the positive electrode current collector is not particularly limited, for example, it can be set to 5 to 50 μm.

The amount of the conductivity-imparting agent to be added can be 1 to 10% by mass, and is preferably 2 to 7% by mass. Due to the amount to be added being 1% by mass or more, a sufficient conductivity can be maintained. Further, due to the amount to be added being 10% by mass or less, the mass fraction of the positive electrode active material can be increased, and hence the capacity per mass can be increased. The amount of the binder to be added can be 1 to 10% by mass, and is preferably 2 to 7% by mass. Due to the amount to be added being 1% by mass or more, the peel-off of the positive electrode can be prevented. Further, due to the amount to be added being 10% by mass or less, the mass fraction of the positive electrode active material can be increased, and hence the capacity per mass can be increased.

Although the thickness of the positive electrode is not particularly limited, for example, it can be set to 50 to 500 μm, and is preferably 100 to 400 μm.

[Lithium-Ion Secondary Battery]

A lithium-ion secondary battery according to an exemplary embodiment includes the positive electrode for a lithium-ion secondary battery according to an exemplary embodiment and a negative electrode.

Figure 1:
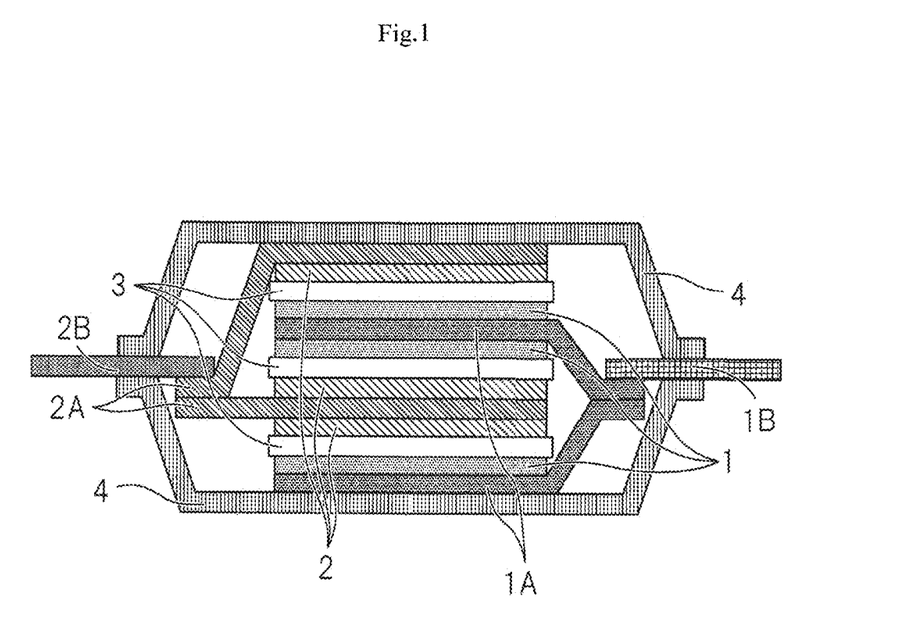
FIG. 1 is a cross-sectional view of an example of a lithium-ion secondary battery according to an exemplary embodiment.

One example of the secondary battery according to an exemplary embodiment is shown in FIG. 1. In the secondary battery shown in FIG. 1, a positive electrode active material layer 1 containing the positive electrode active material according to an exemplary embodiment is formed on a positive electrode current collector 1A to configure a positive electrode. Further, a negative electrode active material layer 2 is formed on a negative electrode current collector 2A to configure a negative electrode. These positive electrode and negative electrode, being soaked in an electrolytic solution, are oppositely disposed with a separator 3 sandwiched therebetween and laminated. Further, the positive electrode and the negative electrode are connected to a positive electrode tab 1B and a negative electrode tab 2B, respectively. This power-generating element is contained in an outer package 4 with the positive electrode tab 1B and the negative electrode tab 2B exposed to the outside.

By applying a voltage to the positive electrode and the negative electrode, a lithium ion is detached from the positive electrode active material and the lithium ion is intercalated in the negative electrode active material, which results in charging. Alternatively, by electrically contacting the positive electrode with the negative electrode in the outside of the secondary battery, contrary to the case of charging, a lithium ion is deintercalated from the negative electrode active material and the lithium ion is intercalated in the positive electrode active material, which results in discharging.

The electrolytic solution to be used for the secondary battery according to an exemplary embodiment can be a solution obtained by dissolving a lithium salt as a supporting electrolyte in a solvent. The solvent to be used can be a cyclic carbonate such as ethylene carbonate (EC), propylene carbonate (PC), butylene carbonate (BC) and vinylene carbonate (VC); a chain carbonate such as dimethyl carbonate (DMC), ethyl methyl carbonate (EMC), diethyl carbonate (DEC) and dipropyl carbonate (DPC); an aliphatic carboxylate such as methyl formate, methyl acetate and ethyl propionate; a γ-lactone such as γ-butyrolactone; a chain ether such as 1,2-diethoxyethane (DEE) and ethoxymethoxyethane (EME); a cyclic ether such as tetrahydrofuran and 2-methyltetrahydrofuran; an aprotic organic solvent such as dimethyl sulfoxide, 1,3-dioxolane, formamide, acetamide, dimethylformamide, dioxolane, acetonitrile, propylnitrile, nitromethane, ethyl monoglyme, a phosphoric triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, N-methylpyrrolidone and a fluorinated carboxylate, or the like. One of these may be used singly, or two or more thereof may be used in combination. Among them, a mixed solution of a cyclic carbonate and a chain carbonate is preferably used as the solvent from the viewpoint of stability at a high voltage and the viscosity of the solvent.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lithium salts of lower aliphatic carboxylic acids, chloroborane lithium, lithium tetraphenylborate, LiBr, LiI, LiSCN, LiCl and imides. One of these may be used singly, or two or more thereof may be used in combination.

The concentration of the lithium salt as the supporting electrolyte can be, for example, 0.5 to 1.5 mol/L, and is preferably 0.7 to 1.3 mol/L. Due to the concentration of the lithium salt being 0.5 mol/L or more, a sufficient electrical conductivity can be obtained. Further, due to the concentration of the lithium salt being 1.5 mol/L or less, the increase of the density and viscosity can be reduced.

Alternatively, a polymer electrolyte may be used which is obtained by adding a polymer or the like to a solvent for an electrolytic solution to solidify the electrolytic solution into a gel.

The negative electrode active material to be used can be a material capable of intercalating/deintercalating lithium. The negative electrode active material to be used can be, for example, a carbon material such as graphite, hard carbon, soft carbon and amorphous carbon; metal lithium, Si, Sn and Al; an Si oxide such as SiO; an Sn oxide; $Li_4Ti_5O_{12}$; a Ti oxide such as $TiO_2$; and a V-containing oxide, an Sb-containing oxide, an Fe-containing oxide and a Co-containing oxide. One of these negative electrode active materials may be used singly, or two or more thereof may be used in combination. Particularly for the secondary battery according to an exemplary embodiment, the negative electrode active material to be used is preferably SiO from the viewpoint that the irreversible capacity is canceled in association with the positive electrode active material according to an exemplary embodiment.

The negative electrode can be made, for example, by mixing the negative electrode active material, a conductivity-imparting agent, a binder and a solvent together, coating a negative electrode current collector with the mixture, and drying the resultant. The conductivity-imparting agent to be used can be, for example, a carbon material, a conductive oxide or the like. The binder to be used can be a polyvinylidene fluoride, an acrylic resin, a styrene-butadiene rubber, an imide-based resin, an imide-amide-based resin, a polytetrafluoroethylene resin, a polyamic acid or the like. The solvent to be used can be N-methylpyrrolidone or the like. The negative electrode current collector to be used can be a metal thin film primarily containing aluminum, copper or the like. Although the thickness of the negative electrode current collector is not particularly limited, for example, it can be set to 5 to 50 μm, and is preferably 10 to 40 μm. Further, although the thickness of the negative electrode is not particularly limited, for example, it can be set to 10 to 100 μm, and is preferably 20 to 70 μm.

The secondary battery according to an exemplary embodiment can be produced by assembling using the positive electrode according to an exemplary embodiment. For example, the positive electrode according to an exemplary embodiment and a negative electrode are oppositely disposed with a separator sandwiched therebetween without being electrically contacted in an atmosphere of a dry air or an inert gas. The separator to be used can be a porous film containing a polyethylene, a polypropylene (PP), a polyimide, a polyamide or the like.

The assemblage of the positive electrode and the negative electrode oppositely disposed with the separator sandwiched therebetween is configured in a cylindrical or laminated form and contained in an outer package. The outer package to be used can be a battery can, a laminated film, which is a laminate of a synthetic resin and a metal foil, or the like. The positive electrode and the negative electrode are connected to a positive electrode tab and a negative electrode tab, respectively, in a manner such that these electrode tabs are exposed to the outside of the outer package. The outer package is sealed with a part thereof unsealed, from which an electrolytic solution is injected, and then the outer package is completely sealed to provide a secondary battery. Further, activation treatment may be performed for the secondary battery before use.

The shape of the assemblage of the positive electrode and the negative electrode oppositely disposed with the separator sandwiched therebetween is not particularly limited, and can be a wound shape, a laminated shape or the like. The type of the secondary battery can be a coin type, a laminated type or the like. The shape of the secondary battery can be a rectangular shape, a cylindrical shape or the like.

EXAMPLES

Hereinafter, Examples of exemplary embodiments are illustrated, but exemplary embodiments are not limited to these Examples.

Example 1

<Synthesis of Lithium-Iron-Manganese-Based Composite Oxide>

Iron (III) nitrate, manganese (II) chloride and nickel (II) nitrate which had been weighed so as to achieve a predetermined atom ratio were dissolved in distilled water to make an aqueous solution of metal salts (total amount: 0.25 mol/batch). Separately, 1.25 mol/L of an aqueous lithium hydroxide solution was prepared, to which ethanol was added to make the solution non-freezable, and thereafter the resultant was cooled to −10° C. in a thermostatic chamber. To this alkaline solution, the aqueous solution of metal salts was gradually added dropwise over 2 hours or longer to make a composite hydroxide. The alkaline solution containing a composite hydroxide after the dropwise addition was removed from the thermostatic chamber, an air was blown into the solution to wet-oxidize for 2 days, and thereafter the composite hydroxide was aged at a room temperature.

After the composite hydroxide after aging was washed with water and filtered out, lithium carbonate in a molar amount equivalent to the molar amount charged was added thereto, and calcined in the atmosphere at 850° C. for 5 hours. After the calcination, the product was milled, washed several times with distilled water, and thereafter filtered out and dried at 100° C. to afford the lithium-iron-manganese-based composite oxide $Li_{1.20}Mn_{0.47}Ni_{0.16}Fe_{0.16}O_{1.89}$.

0.02 g of aluminum isopropoxide was dissolved in 15 mL of ethanol at 50° C. After 30 minutes, 0.5 g of the lithium-iron-manganese-based composite oxide was dispersed in the ethanol solution, and stirred at 50° C. for 1 hour. Then, hydrolysis reaction of the aluminum isopropoxide with moisture in the ethanol progressed, and at the same time the ethanol gradually evaporated to afford a mixture in which the surface of the lithium-iron-manganese-based composite oxide was coated with the hydrolysis product of the aluminum isopropoxide. After 1 hour, the obtained slurry mixture was dried in an air thermostatic chamber at 110° C. overnight. The obtained powder was heat-treated in an air atmosphere at 400° C. for 10 hours to afford a composite oxide in which a part of the surface of the lithium-iron-manganese-based composite oxide was coated with aluminum oxide. As a result of an X-ray diffraction measurement, it was confirmed that this substance had a layered rock-salt structure.

<Making of Positive Electrode>

A mixture containing 92% by mass of the lithium-iron-manganese-based composite oxide as a positive electrode active material in which a part of the surface of the lithium-iron-manganese-based composite oxide $Li_{1.20}Mn_{0.47}Ni_{0.16}Fe_{0.16}O_{1.89}$ was coated with aluminum oxide, 4% by mass of Ketjen black and 4% by mass of a polyvinylidene fluoride was mixed in a solvent to prepare a slurry. The slurry was applied onto a positive electrode current collector of an aluminum foil with a thickness of 20 μm, and the slurry was dried to provide a positive electrode with a thickness of 175 μm. The content of aluminum oxide based on the whole of the lithium-iron-manganese-based composite oxide was 1% by mass.

<Making of Negative Electrode>

A mixture containing 85% by mass of SiO with an average particle diameter of 15 μm and 15% by mass of a polyamic acid was mixed in a solvent to prepare a slurry. The slurry was applied onto a negative electrode current collector of a cupper foil with a thickness of 10 μm, and the slurry was dried to provide a negative electrode with a thickness of 46 μm. The negative electrode provided was annealed in a nitrogen atmosphere at 350° C. for 3 hours to cure the polyamic acid.

<Making of Lithium-Ion Secondary Battery>

After the positive electrode and the negative electrode were shaped, they were laminated together with a porous film separator sandwiched therebetween. Thereafter, a positive electrode tab and a negative electrode tab were welded to the positive electrode and the negative electrode, respectively, to make a power-generating element. The power-generating element was covered with an outer package of an aluminum laminated film, and 3 sides of the outer package were sealed by using heat fusion. Thereafter, an EC/DEC electrolytic solution containing 1 mol/L of $LiPF_6$ was injected into the outer package at a moderate degree of vacuum. Then, the unsealed one side of the outer package was sealed under a reduced pressure by using heat fusion to make a lithium-ion secondary battery before activation treatment.

<Activation Treatment>

The lithium-ion secondary battery before activation treatment was subjected to two charge/discharge cycles in each of which charging was performed to 4.5 V at a current of 20 mA per gram of the positive electrode active material and then discharging was performed to 1.5 V at a current of 20 mA per gram of the positive electrode active material. Thereafter, the sealed portion of the outer package was temporarily opened, the pressure was reduced to remove a gas in the secondary battery, and the opened portion was resealed to make a lithium-ion secondary battery.

<Evaluation of Lithium-Ion Secondary Battery>

The lithium-ion secondary battery was charged to 4.5 V at a constant current of 40 mA per gram of the positive electrode active material and further charged to a current of 5 mA/g at a constant voltage of 4.8 V in a thermostatic chamber at 45° C. Then, the lithium-ion secondary battery was discharged to 1.5 V at a current of 10 mA/g. The lithium-ion secondary battery was subjected to 100 charge/discharge cycles in each of which charging was performed to 4.5 V at a constant current of 40 mA per gram of the positive electrode active material, charging was further performed to a current of 5 mA/g at a constant voltage of 4.5 V, and thereafter discharging was performed to 1.5 V at a current of 40 mA/g in a thermostatic chamber at 45° C. The capacity retention rate after 100 cycles was determined from the ratio of the discharge capacity obtained at the 100th cycle to that obtained at the first cycle. The capacity retention rate after 100 cycles in this Example 1 was 80%.

Comparative Example 1

A lithium-ion secondary battery was made and evaluated in the same way as in Example 1 except that the lithium-iron-manganese-based composite oxide $Li_{1.19}Mn_{0.47}Ni_{0.16}Fe_{0.17}O_{1.99}$, the surface of which was not coated, was used as a positive electrode active material. The capacity retention rate after 100 cycles in this Comparative Example 1 was 56%.

Example 2

<Synthesis of Lithium-Iron-Manganese-Based Composite Oxide>

Figure 2:
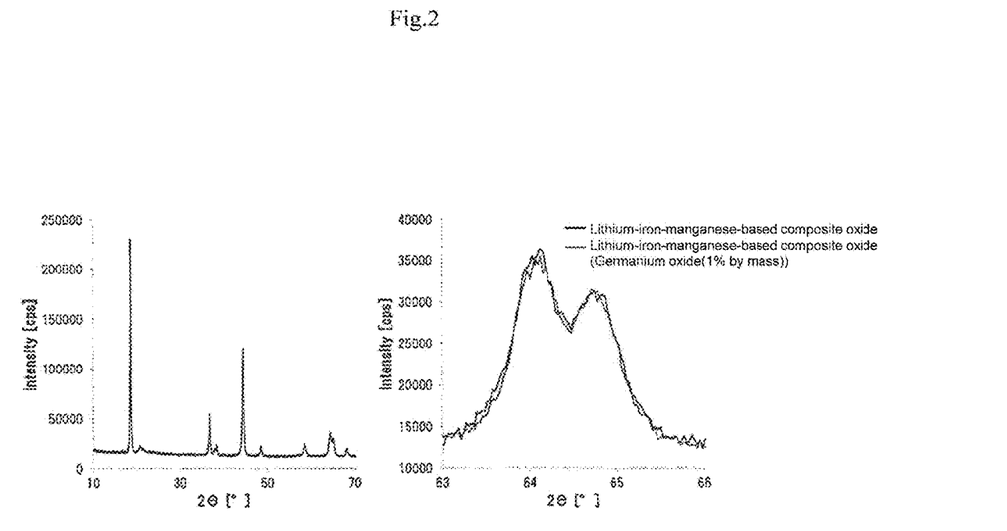
FIG. 2 shows the XRDs of a lithium-iron-manganese-based composite oxide and a lithium-iron-manganese-based composite oxide coated with germanium oxide in Example 2.
Figure 3:
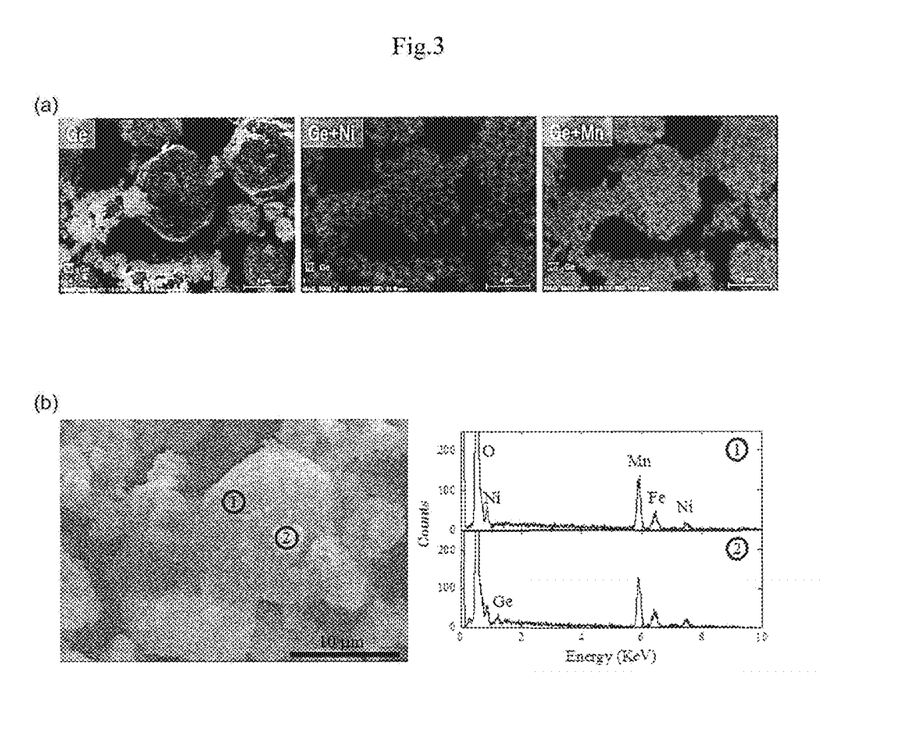

0.2 g of germanium oxide and 0.048 g of lithium hydroxide were dissolved in 10 mL of water. The obtained solution was applied by spraying onto 20 g of the lithium-iron-manganese-based composite oxide before being coated with aluminum oxide synthesized in Example 1. The obtained slurry mixture was dried in an air thermostatic chamber at 110° C. overnight. The powder was heat-treated in an air atmosphere at 400° C. for 10 hours to afford a composite oxide in which a part of the surface of the lithium-iron-manganese-based composite oxide was coated with germanium oxide. The content of germanium oxide was 1% by mass. Further, it was confirmed from the diffraction pattern in an X-ray diffraction measurement (XRD) that this substance had a layered rock-salt structure (FIG. 2). In addition, no peak shift caused by the coating of germanium oxide was observed and hence the structure of the lithium-iron-manganese-based composite oxide as the base material was almost unchanged (FIG. 2). FIG. 3(a) shows SEM images (scanning electron microscopy image) and results of EDX (energy dispersive X-ray spectrometry) analyses. The left image is an image obtained by mapping germanium on an SEM image, the center image is an image obtained by mapping nickel and germanium on the SEM image and the right image is an image obtained by mapping manganese and germanium on the SEM image. FIG. 3(b) shows results of spot analyses on an SEM image by using EDX. From these results, it was found that a part of the surface of the lithium-iron-manganese-based composite oxide was coated with germanium oxide.

<Making of Positive Electrode>

A mixture containing 92% by mass of the lithium-iron-manganese-based composite oxide as a positive electrode active material in which a part of the surface of the lithium-iron-manganese-based composite oxide $Li_{1.20}Mn_{0.47}Ni_{0.16}Fe_{0.16}O_{1.89}$ was coated with aluminum oxide, 4% by mass of Ketjen black and 4% by mass of a polyvinylidene fluoride was mixed in a solvent to prepare a slurry. The slurry was applied onto a positive electrode current collector of an aluminum foil with a thickness of 20 μm, and the slurry was dried to provide a positive electrode with a thickness of 130 μm.

<Making of Negative Electrode>

A mixture containing 92% by mass of graphite with an average particle diameter of 15 μm, 4% by mass of a PVDF (polyvinylidene fluoride) and 4% by mass of Ketjen black was mixed in a solvent to prepare a slurry. The slurry was applied onto a negative electrode current collector of a cupper foil with a thickness of 10 μm, and the slurry was dried to provide a negative electrode with a thickness of 100 μm.

<Making of Lithium-Ion Secondary Battery>

After the positive electrode and the negative electrode were shaped, they were laminated together with a porous film separator sandwiched therebetween. Thereafter, a positive electrode tab and a negative electrode tab were welded to the positive electrode and the negative electrode, respectively, to make a power-generating element. The power-generating element was covered with an outer package of an aluminum laminated film, and 3 sides of the outer package were sealed by using heat fusion. Thereafter, an EC/DEC electrolytic solution containing 1 mol/L of $LiPF_6$ was injected into the outer package at a moderate degree of vacuum. Then, the unsealed one side of the outer package was sealed under a reduced pressure by using heat fusion to make a lithium-ion secondary battery before activation treatment.

<Activation Treatment>

The lithium-ion secondary battery before activation treatment was subjected to a step-wise activation treatment to increase the voltage step-wise (4.0 to 4.5 V) in which charge/discharge cycles were repeated at a current of 20 mA per gram of the positive electrode active material while the upper limit voltage of the charge/discharge range of 4.0 V to 1.5 V was incremented by 0.1 V every cycle.

<Evaluation of Lithium-Ion Secondary Battery>

The lithium-ion secondary battery was charged to 4.5 V at a constant current of 40 mA per gram of the positive electrode active material and further charged to a current of 10 mA/g at a constant voltage of 4.5 V in a thermostatic chamber at 45° C. Then, the lithium-ion secondary battery was discharged to 1.5 V at a current of 40 mA/g. This charge/discharge cycle was repeated 9 times. Then, charging was performed to 4.5 V at a constant current of 10 mA per gram of the positive electrode active material and charging was further performed to a current of 2.5 mA/g at a constant voltage of 4.5 V. Thereafter, the lithium-ion secondary battery was discharged to 1.5 V at a current of 10 mA/g. The total 10 cycles consisting of the above 9 cycles and 1 cycle were performed 3 times, that is, 30 cycles were performed. From the ratio of the discharge capacity obtained at the 30th cycle to that obtained at the first cycle, the capacity retention rate after 30 cycles was determined. Further, the volume of the secondary battery before the charging/discharging and that after 30 cycles were measured by using the Archimedes method, and the difference was defined as the amount of a gas generated. The result is shown in Table 1.

Example 3

A composite oxide in which a part of the surface of the lithium-iron-manganese-based composite oxide was coated with germanium oxide was synthesized in the same way as in Example 2 except that the content of germanium oxide was changed to 2% by mass. It was confirmed from the X-ray diffraction measurement and EDX analysis as described in Example 2 that the composite oxide was a composite oxide having a layered rock-salt structure in which a part of the surface was coated with germanium oxide. A lithium-ion secondary battery was made by using the composite oxide and evaluated in the same way as in Example 2. The result is shown in Table 1.

Example 4

A composite oxide in which a part of the surface of the lithium-iron-manganese-based composite oxide was coated with germanium oxide was synthesized in the same way as in Example 2 except that the content of germanium oxide was changed to 3% by mass. It was confirmed from the X-ray diffraction measurement and EDX analysis as described in Example 2 that the composite oxide was a composite oxide having a layered rock-salt structure in which a part of the surface was coated with germanium oxide. A lithium-ion secondary battery was made by using the composite oxide and evaluated in the same way as in Example 2. The result is shown in Table 1.

Example 5

A composite oxide in which a part of the surface of the lithium-iron-manganese-based composite oxide was coated with germanium oxide was synthesized in the same way as in Example 2 except that the content of germanium oxide was changed to 9% by mass. It was confirmed from the X-ray diffraction measurement and EDX analysis as described in Example 2 that the composite oxide was a composite oxide having a layered rock-salt structure in which a part of the surface was coated with germanium oxide. A lithium-ion secondary battery was made by using the composite oxide and evaluated in the same way as in Example 2. The result is shown in Table 1.

Example 6

A lithium-ion secondary battery was made and evaluated in the same way as in Example 2 except that the lithium-iron-manganese-based composite oxide in which a part of the surface was coated with aluminum oxide synthesized in Example 1 was used as a positive electrode active material. The result is shown in Table 1.

Example 7

0.02 g of titanium tetraisopropoxide was dissolved in 15 mL of ethanol at 50° C. After 30 minutes, 0.5 g of the lithium-iron-manganese-based composite oxide before being coated with aluminum oxide synthesized in Example 1 was dispersed in the ethanol solution, and stirred at 50° C. for 1 hour to afford a slurry mixture in which a part of the surface of the lithium-iron-manganese-based composite oxide was coated with a hydrolysis product of the titanium tetraisopropoxide. The slurry mixture was dried in an air thermostatic chamber at 110° C. overnight, and thereafter heat-treated in an air atmosphere at 400° C. for 10 hours. Thereby, a composite oxide in which a part of the surface of the lithium-iron-manganese-based composite oxide was coated with titanium oxide was synthesized. The content of titanium oxide was 1% by mass. It was confirmed from the X-ray diffraction measurement and EDX analysis as described in Example 2 that the composite oxide was a composite oxide having a layered rock-salt structure in which a part of the surface was coated with titanium oxide.

A lithium-ion secondary battery was made by using the composite oxide and evaluated in the same way as in Example 2. The result is shown in Table 1.

Example 8

A composite oxide in which a part of the surface of the lithium-iron-manganese-based composite oxide was coated with titanium oxide was synthesized in the same way as in Example 7 except that the content of titanium oxide was changed to 9% by mass. It was confirmed from the X-ray diffraction measurement and EDX analysis described in Example 2 that the composite oxide was a composite oxide having a layered rock-salt structure in which a part of the surface was coated with titanium oxide. A lithium-ion secondary battery was made by using the composite oxide and evaluated in the same way as in Example 2. The result is shown in Table 1.

Example 9

A composite oxide in which a part of the surface of the lithium-iron-manganese-based composite oxide was coated with silicon oxide was synthesized by using the same method as in Example 7 except that tetraethyl orthosilicate was used in place of titanium tetraisopropoxide. The content of silicon oxide was 9% by mass. It was confirmed from the X-ray diffraction measurement and EDX analysis as described in Example 2 that the composite oxide was a composite oxide having a layered rock-salt structure in which a part of the surface was coated with silicon oxide. A lithium-ion secondary battery was made by using the composite oxide and evaluated in the same way as in Example 2. The result is shown in Table 1.

Example 10

A composite oxide in which a part of the surface of the lithium-iron-manganese-based composite oxide was coated with tin oxide was synthesized by using the method described in Example 7 except that tetraethoxytin was used in place of titanium tetraisopropoxide. The content of tin oxide was 9% by mass. It was confirmed from the X-ray diffraction measurement and EDX analysis as described in Example 2 that the composite oxide was a composite oxide having a layered rock-salt structure in which a part of the surface was coated with tin oxide. A lithium-ion secondary battery was made by using the composite oxide and evaluated in the same way as in Example 2. The result is shown in Table 1.

Example 11

Cerium acetate was dissolved in 10 mL of water, and this was applied by spraying onto the composite oxide in which a part of the surface of the lithium-iron-manganese-based composite oxide was coated with germanium oxide obtained in Example 2. The obtained slurry mixture was dried in an air thermostatic chamber at 110° C. overnight. The powder was heat-treated in an air atmosphere at 400° C. for 10 hours to synthesize a composite oxide in which a part of the surface of the lithium-iron-manganese-based composite oxide was coated with cerium oxide and germanium oxide. The content of cerium oxide was 1% by mass and the content of germanium oxide was 2% by mass. It was confirmed from the X-ray diffraction measurement and EDX analysis as described in Example 2 that the composite oxide was a composite oxide having a layered rock-salt structure in which a part of the surface was coated with cerium oxide and germanium oxide. A lithium-ion secondary battery was made by using the composite oxide and evaluated in the same way as in Example 2. The result is shown in Table 1.

Example 12

A composite oxide in which a part of the surface of the lithium-iron-manganese-based composite oxide was coated with gadolinium oxide and germanium oxide was synthesized by using the same method as in Example 11 except that gadolinium acetate was used in place of cerium acetate. The content of gadolinium oxide was 1% by mass and the content of germanium oxide was 2% by mass. It was confirmed from the X-ray diffraction measurement and EDX analysis as described in Example 2 that the composite oxide was a composite oxide having a layered rock-salt structure in which a part of the surface was coated with gadolinium oxide and germanium oxide. A lithium-ion secondary battery was made by using the composite oxide and evaluated in the same way as in Example 2. The result is shown in Table 1.

Example 13

A composite oxide in which a part of the surface of the lithium-iron-manganese-based composite oxide was coated with erbium oxide and germanium oxide was synthesized by using the same method as in Example 11 except that erbium acetate was used in place of cerium acetate. The content of erbium oxide was 1% by mass and the content of germanium oxide was 2% by mass. It was confirmed from the X-ray diffraction measurement and EDX analysis as described in Example 2 that the composite oxide was a composite oxide having a layered rock-salt structure in which a part of the surface was coated with erbium oxide and germanium oxide. A lithium-ion secondary battery was made by using the composite oxide and evaluated in the same way as in Example 2. The result is shown in Table 1.

Example 14

0.1 g of gadolinium acetate was dissolved in 10 mL of water, and this was applied by spraying onto the composite oxide in which a part of the surface of the lithium-iron-manganese-based composite oxide was coated with germanium oxide obtained in Example 2, dried, and calcined to synthesize a composite oxide in which a part of the surface of the lithium-iron-manganese-based composite oxide was coated with gadolinium oxide. The content of gadolinium oxide was 1% by mass. It was confirmed from the X-ray diffraction measurement and EDX analysis as described in Example 2 that the composite oxide was a composite oxide having a layered rock-salt structure in which a part of the surface was coated with gadolinium oxide. A lithium-ion secondary battery was made by using the composite oxide and evaluated in the same way as in Example 2. The result is shown in Table 1.

Example 15

A composite oxide in which a part of the surface of the lithium-iron-manganese-based composite oxide was coated with molybdenum oxide was synthesized by using the same method as in Example 2 except that molybdenum oxide was used in place of germanium oxide. The content of molybdenum oxide was 2% by mass. It was confirmed from the X-ray diffraction measurement and EDX analysis as described in Example 2 that the composite oxide was a composite oxide having a layered rock-salt structure in which a part of the surface was coated with molybdenum oxide. A lithium-ion secondary battery was made by using the composite oxide and evaluated in the same way as in Example 2. The result is shown in Table 1.

Example 16

0.4 g of germanium oxide, 0.2 g of molybdenum oxide and 0.048 g of lithium hydroxide were dissolved in 10 mL of water. This was applied by spraying onto 20 g of the lithium-iron-manganese-based composite oxide before being coated with aluminum oxide synthesized in Example 1, dried, and calcined to synthesize a composite oxide in which a part of the surface of the lithium-iron-manganese-based composite oxide was coated with molybdenum oxide and germanium oxide. The content of molybdenum oxide was 1% by mass and the content of germanium oxide was 2% by mass. It was confirmed from the X-ray diffraction measurement and EDX analysis as described in Example 2 that the composite oxide was a composite oxide having a layered rock-salt structure in which a part of the surface was coated with molybdenum oxide and germanium oxide. A lithium-ion secondary battery was made by using the composite oxide and evaluated in the same way as in Example 2. The result is shown in Table 1.

Example 17

A composite oxide in which a part of the surface of the lithium-iron-manganese-based composite oxide was coated with aluminum oxide and germanium oxide was synthesized by using the same method as in Example 11 except that aluminum acetate was used in place of cerium acetate. The content of aluminum oxide was 1% by mass and the content of germanium oxide was 2% by mass. It was confirmed from the X-ray diffraction measurement and EDX analysis as described in Example 2 that the composite oxide was a composite oxide having a layered rock-salt structure in which a part of the surface was coated with aluminum oxide and germanium oxide. A lithium-ion secondary battery was made by using the composite oxide and evaluated in the same way as in Example 2. The result is shown in Table 1.

Comparative Example 2

A lithium-ion secondary battery was made and evaluated in the same way as in Example 2 except that the lithium-iron-manganese-based composite oxide before being coated with aluminum oxide synthesized in Example 1 was used as a positive electrode active material. The result is shown in Table 1.

TABLE 1

|  | Inorganic material | Capacity retention rate (%) | Amount of gas generated (ml/g) |
|---|---|---|---|
| Example 2 | germanium oxide (1% by mass) | 92 | 10 |
| Example 3 | germanium oxide (2% by mass) | 92 | 10 |
| Example 4 | germanium oxide (3% by mass) | 92 | 10 |
| Example 5 | germanium oxide (9% by mass) | 92 | 10 |
| Example 6 | aluminum oxide (1% by mass) | 92 | 14 |
| Example 7 | titanium oxide (1% by mass) | 90 | 14 |
| Example 8 | titanium oxide (9% by mass) | 89 | 14 |
| Example 9 | silicon oxide (9% by mass) | 89 | 14 |
| Example 10 | tin oxide (9% by mass) | 89 | 12 |
| Example 11 | cerium oxide (1% by mass)/ germanium oxide (2% by mass) | 92 | 8 |
| Example 12 | gadolinium oxide (1% by mass)/ germanium oxide (2% by mass) | 92 | 8 |
| Example 13 | erbium oxide (1% by mass)/ germanium oxide (2% by mass) | 92 | 7 |
| Example 14 | gadolinium oxide (1% by mass) | 91 | 10 |
| Example 15 | molybdenum oxide (2% by mass) | 90 | 13 |
| Example 16 | molybdenum oxide (1% by mass)/ germanium oxide (2% by mass) | 91 | 12 |
| Example 17 | aluminum oxide (1% by mass)/ germanium oxide (2% by mass) | 91 | 12 |
| Comparative Example 2 | — | 89 | 15 |

Figure 4:
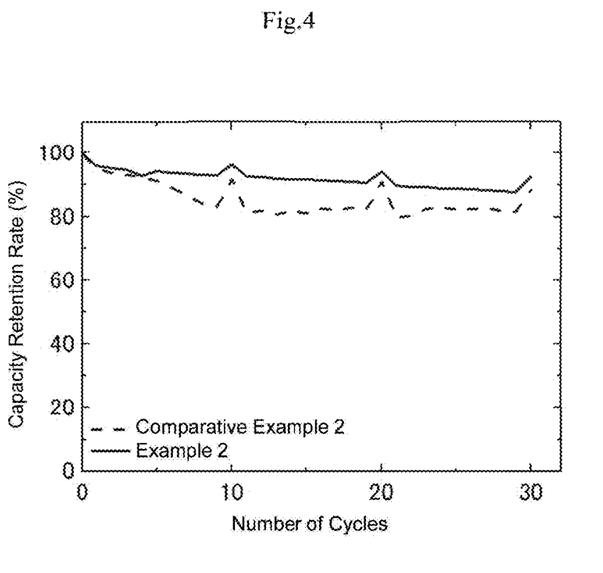
FIG. 4 is a graph illustrating the capacity retention rate related to the number of cycles in Comparative Example 2 and Example 2.

FIG. 4 is a graph showing the capacity retention rate related to the number of cycles in Comparative Example 2 and Example 2. Here, the initial discharge capacities were 249 mAh/g and 247 mAh/g, respectively. From FIG. 4, it was found that the coating with germanium oxide was able not only to suppress capacity reduction, but also to eliminate any significant capacity change in cycles and as a result stabilize the capacity. From Table 1, the capacity retention rates after 30 cycles in Comparative Example 2 and Example 2 were 89% and 92%, respectively. The amounts of a gas generated per gram of the positive electrode active material were 15 mL/g and 10 mL/g, respectively, which indicates that the coating with germanium oxide on the surface reduced the generation of a gas. Further, with regard to the coatings with other inorganic materials, it was effective to use germanium oxide, cerium oxide, gadolinium oxide, erbium oxide or molybdenum oxide especially as the inorganic material in view of the capacity retention rate and the amount of a gas generated in Table 1. Although the content of germanium oxide caused no significant differences in the capacity retention rate and the amount of a gas generated among Examples 2 to 5, the initial discharge capacities were 247 mAh/g, 247 mAh/g, 244 mAh/g and 218 mAh/g, respectively, and therefore 3% by mass or less of germanium oxide is effective from the viewpoint of increasing the capacity.

This application claims the priority to Japanese Patent Application No. 2013-173271 filed on Aug. 23, 2013, the content of which is entirely incorporated herein.

Hereinbefore, the invention of the present application has been illustrated referring to exemplary embodiments and Examples, but the invention of the present application is not limited to the above exemplary embodiments and Examples. For the configuration and details of the invention of the present application, various modifications can be made that those skilled in the art can appreciate within the scope of the invention of the present application.

INDUSTRIAL APPLICABILITY

The lithium-ion secondary battery according to an exemplary embodiment has a high energy density and is also excellent in cycle characteristics, and accordingly can be widely utilized for an electronic device, an electrical vehicle, a battery for storing electrical power for general household or facilities, or the like.

REFERENCE SIGNS LIST 1 positive electrode active material layer
1A positive electrode current collector
1B positive electrode tab
2 negative electrode active material layer
2A negative electrode current collector
2B negative electrode tab
3 separator
4 outer package

The invention claimed is:

1. A lithium-iron-manganese-based composite oxide having a layered rock-salt structure, wherein at least a part of a surface of a lithium-iron-manganese-based composite oxide represented by the following formula (1) is coated with an inorganic material:

(1)

$Li_xM^1_{(y-p)}Mn_pM^2_{(z-p)}Fe_qO_{(2-\delta)}$ wherein $1.05 \leq x \leq 1.32$, $0.33 \leq y \leq 0.63$, $0.06 \leq z \leq 0.50$, $0 < p \leq 0.63$, $0.16 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn, wherein the inorganic material is at least one selected from the group consisting of germanium oxide, tin oxide, silicon oxide, molybdenum oxide, cerium oxide, gadolinium oxide, erbium oxide, aluminum oxide, aluminum fluoride and titanium oxide, and wherein a content of the inorganic material is 0.1% by mass or more and 15% by mass or less.

2. The lithium-iron-manganese-based composite oxide according to claim 1, wherein, in the formula (1), q satisfies $0.16 \leq q \leq 0.45$.

3. The lithium-iron-manganese-based composite oxide according to claim 1, wherein, in the formula (1), $\delta$ satisfies $0.02 \leq \delta \leq 0.50$.

4. A positive electrode active material for a lithium-ion secondary battery, wherein the positive electrode active material comprises the lithium-iron-manganese-based composite oxide according to claim 1.

5. A positive electrode for a lithium-ion secondary battery, wherein the positive electrode comprises the positive electrode active material for a lithium-ion secondary battery according to claim 4.

6. A lithium-ion secondary battery comprising the positive electrode for a lithium-ion secondary battery according to claim 5 and a negative electrode.

7. The lithium-ion secondary battery according to claim 6, wherein the negative electrode comprises SiO as a negative electrode active material.

* * * * *

UNITED STATES PATENT AND TRADEMARK OFFICE
CERTIFICATE OF CORRECTION

PATENT NO. : 10,164,250 B2
APPLICATION NO. : 14/913892
DATED : December 25, 2018
INVENTOR(S) : Kentaro Nakahara et al.

It is certified that error appears in the above-identified patent and that said Letters Patent is hereby corrected as shown below:

On the Title Page

At Abstract, replace "$M^2_{(z-p)}$" with -- $M^2_{(z-q)}$ -- in formula (1).

In the Specification

At Column 2, Line number 5, replace "$M^2_{(z-p)}$" with -- $M^2_{(z-q)}$ -- in formula (1).

At Column 2, Line number 58, replace "$M^2_{(z-p)}$" with -- $M^2_{(z-q)}$ -- in formula (1).

In the Claims

At Column 19, Claim number 1, Line number 23, replace "$M^2_{(z-p)}$" with -- $M^2_{(z-q)}$ -- in formula (1).

Signed and Sealed this
Fifth Day of March, 2019

Andrei Iancu
*Director of the United States Patent and Trademark Office*